June 17, 1958 E. J. LEONARD 2,839,609
TERMINAL-PER-STATION PARTY-LINE TELEPHONE SYSTEM
Filed April 4, 1955
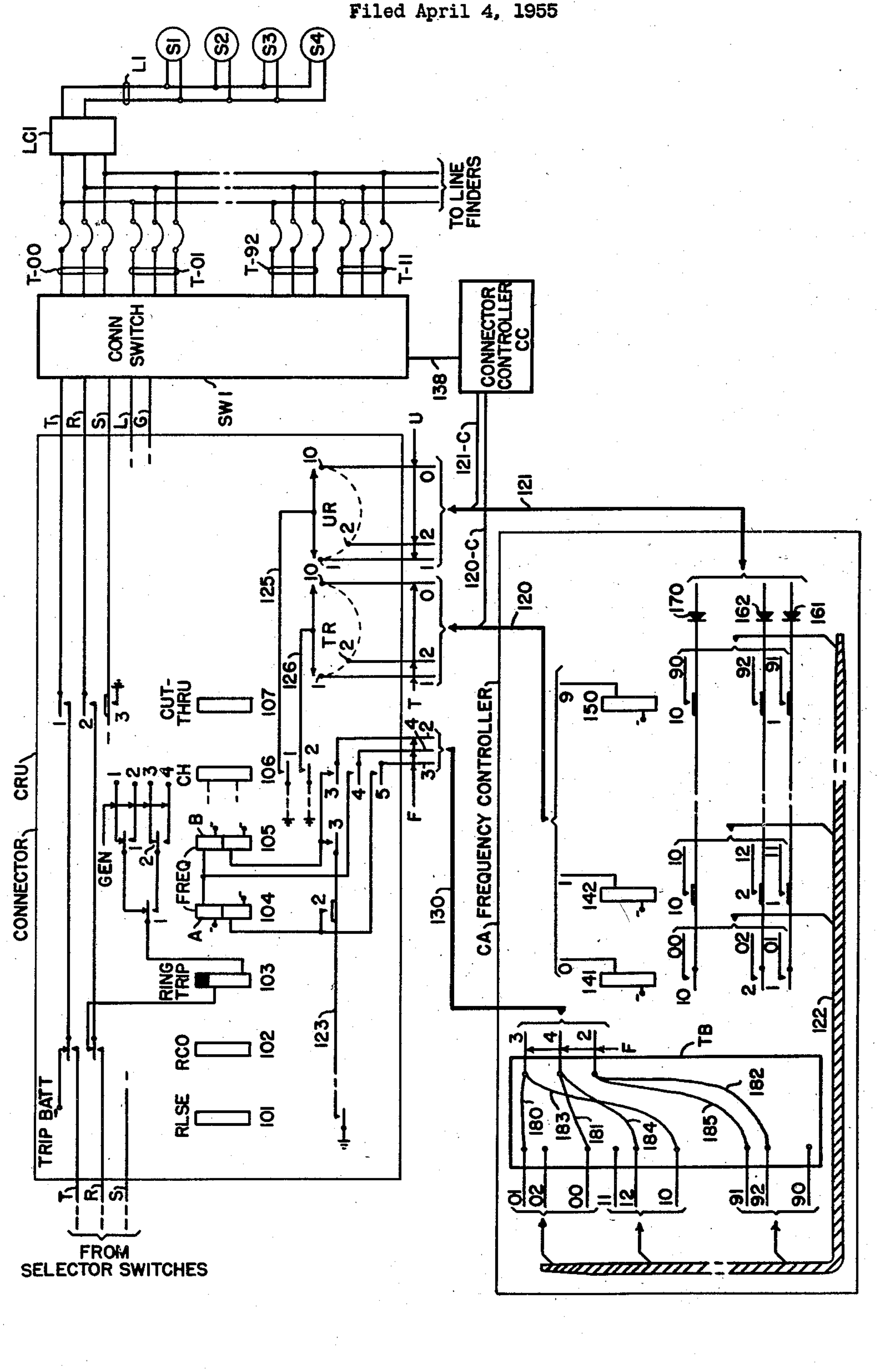

United States Patent Office 2,839,609 Patented June 17, 1958

2,839,609

TERMINAL-PER-STATION PARTY-LINE TELEPHONE SYSTEM

Edward J. Leonard, Chicago, Ill., assignor to International Telephone and Telegraph Corporation, New York, N. Y., a corporation of Maryland Application April 4, 1955, Serial No. 498,908

4 Claims. (Cl. 179—17)

This invention relates to a terminal-per-station party-line telephone system. Its principal object is to provide a simple and economical arrangement for providing terminal-per-station service for telephone party lines.

*General description*

In party line telephone systems providing terminal-per-station service, a number of switchboard terminals, each having a different call designation assigned thereto, may be connected together and assigned as a group to a single line. In such an arrangement, a desired line may be reached by the calling of any one of the call designations of the assigned terminals connected thereto, arrangements being provided to selectively signal the desired station one such line in accordance with the designation called.

Heretofore in terminal-per-station party-line systems, one common arrangement was to employ a fourth conductor in the connector multiple which selectively controlled the signalling of the desired station on a party line. Other arrangements selectively controlled the signalling of desired stations on party lines by time-positioned arrangements which controlled the application of the proper signal to the line.

The present invention provides an adapter arrangement for readily converting the final or connector stage of an automatic telephone system from an individual to a multi-party line basis and which renders unnecessary the additional fourth conductor and the somewhat costly time-positioning device. This is accomplished by providing a common group of recording relays which record a portion of the called terminal designation and according to a predetermined jumper arrangement, directly controls the individual connector units to apply the proper signal.

The present invention has advantages over the prior arrangements in that the required conductors for providing terminal-per-station service are maintained at a minimum, the usual complex jumpering schemes and apparatus are eliminated, and the additional apparatus usually required for directory number changes is reduced.

The above-mentioned and other features and objects of this invention and the manner of attaining them will become more apparent and the invention itself will be best understood, by reference to the following description of an embodiment of the invention taken in conjunction with the accompanying drawing wherein a standard connector relay unit CRU and associated terminal-per-station control apparatus CA is shown.

It has been chosen to disclose the present invention as embodied in a connector system such as disclosed in the United States patent application of R. W. Hutton et al. for a Multi-Group Direct-Access Crossbar Telephone Switching System, Serial No. 359,761, filed June 5, 1953. In such application, the connector relay unit 1100 thereof is arranged to respond to a dialed station's digit to select one of a number of ringing current frequencies in order that the desired station on a called line be signalled.

The operation of connector CRU of the present invention is generally similar to that of connector 1100 of the above application excepting that the station recording and signalling apparatus is replaced by frequency control relays A and B, their operation being described in detail hereinafter.

*Detailed description*

Referring to the drawing, there is shown a multi-party line L1 having four subscriber stations S1 to S4 associated therewith, a connector unit CRU, a frequency adapter circuit CA, common to a group of such connector units, and an associated connector swtich SW1 for connecting the connector unit to a desired line L1.

The preceding finder and selector stages are of the well-known type and no detailed description of such stages is required for a complete understanding of the present invention, such stages being similar to those of the noted application.

In order to make up a party line, such as line L1, the switch terminals of the connector switch SW1 which are desired to be assigned to line L1 are connected together and assigned a single line circuit, such as line circuit LC1. In this disclosure, it has been chosen to assign four switch terminals, having call designations 00, 01, 92, and 11, to line L1, the first digit of the above designation corresponding to the tens digit and the last digit of such designations corresponding to the dialed units digit. These terminal designations are indicated as on the drawings as T–00, T–01, T–92, and T–11.

It will be noted that the tens and units conductors associated with the tens register TR and the units register UR, which are connected to the connector controller in the well-known manner, are also associated with the frequency control apparatus CA over respective conductors in cable groups 120 and 121. In addition to the usual wiring, an additional cable, comprising wires F2 to F4, is provided, these wires being associated with the terminal board TB of the control apparatus CA over conductors in cable group 130.

In the connector units CRU, a pair of relays 104 and 105 are shown which respond to control from the control apparatus CA to control the application of a desired one of four frequencies to a called line, the frequencies employed herein being disclosed as of the harmonic ringing type.

The control apparatus CA comprises a group of ten relays 141 to 150 and an associated terminal board TB. The usual tens wires T1 to T0 are associated respectively with such relays and the usual units wires U1 to U0 are common to the ten contacts on such relays. In this manner, ground appearing on the tens wire operates the associated one of the relays in control apparatus CA and the ground on the units wire is extended through one of the ten contacts thereon to appear on a respectively corresponding terminal on terminal board TB.

Terminal board TB comprises 100 terminal points, the terminals each corresponding to a separate one of the possible 100 call designations available to a normal 100-line connector unit.

Responsive to the selection of the switch terminals that are assigned to a party line and the determination of the desired frequency thereon, the wire on terminal board TB corresponding to the called designation of each of the lines is connected to the associated wires F2 to F4, such that the wire corresponding to the station S2 terminal (T–92) is connected to wire F2, the wire corresponding to the station S3 terminal (T–01) is assigned to wire F3 and the wire corresponding to the station S4 terminal (T–00) is assigned to wire F4. No jumpering is required on terminal board TB for the station S1 terminals (T–11), connector unit CRU being normally arranged to apply a station S1 frequency automatically.

It will be observed that wires F2 to F4 are connected to switch terminal identifying wires other than those above mentioned. Wire F2 is shown connected to wire 91 by jumper 185, such wire corresponding to a station S2 on a line other than line L1. Wires F3 and F4 are also connected by jumpers 183 and 184 to other switch terminal identifying wires, illustrating the flexibility of the jumpering arrangement.

*Station S1 selection*

Assuming a call to have been originated by a calling party (not shown) for station S1 on line L1, such station having the tens and units call designation 11, the call is rounted to connector unit CRU in the well-known manner and operations occur therein to control the tens register and the units register TR and UR to position themselves on the tens wires and units wires corresponding to the call designation 11.

Following the positioning of the tens and units registers, chain relay 106 operates and as described in the Hutton et al. application, operations occur in the connector controller (shown in block diagram) to control the connector switch SW1 to complete the connection to the line terminals T11, such terminals corresponding to the registered tens digit 1 and the registered units digit 1.

At the same time the ground appearing on the T1 wire operates relay 141 and its contacts 1 extend the ground on units wire U1 to wire 11 extending to terminal board TB over a conductor in cable 122. As shown, wire 11 of terminal board TB is not jumper-connected and consequently no operations occur to exercise any control over the connector unit CRU.

Responsive to the completion of a connection to the called line L1 responsive to the dialing of the tens and units digits 11, the cut-through relay 107 operates, restoring the chain relay 106; freeing the connector controller and frequency controller, and completing the circuit for signalling the station S1. At such time, ringing current from the generator-1 lead is extended through break contacts 1 of unoperated relays 104 and 105 and through the winding of trip relay 103 to the ring conductor of line L1, signalling the station S1 thereon in the well-known manner by energizing the selected station ringer by the application of the proper ringing frequency.

Responsive to answer by the called station S1, ring trip relay 103 operates, as is well-known, to disassociate the ringing circuit from the called line conductors, permitting conversation to be carried on in the normal manner.

*Station S2 selection*

Assuming the station S2 on line L1 to be called by the recording of the tens digit 9 and the units digit 2, the hereinbefore described operations occur to position connector switch SW1 on the associated line switch terminals T–92 associated with the called line L1. At the same time, the ground on the tens wire T9 operates relay 150 which at its contacts 2 extends the ground on units wire U2 to terminal board TB.

As shown on jumper board JB, wire 92 is connected by jumper 182 to the F2 wire extending to connector unit CRU over the associated conductor in cable 130. This ground is extended through make contacts 3 of yet-operated chain relay 106 to operate frequency control relay 105.

Responsive to the operation of the cut-through relay 107 subject to the called line being idle, the generator-2 lead is connected through make contacts 1 of relay 105, break contacts 1 of relay 104, and the winding of relay 103 to the ring conductor of the called line in the manner hereinbefore described, signalling station S2 on line L1.

*Station S3 selection*

In the event the assigned call designation 01 of station S3 of line L1, is dialed and recorded in connector unit CRU, the associated relay 141 of controller CA operates and at its make contacts 1 extend the ground appearing on the units wire U1 to wire 01 appearing on terminal board TB. This ground is thereupon extended over jumper 180 to wire F3 extending to the battery-connected winding of relay 104 through make contacts 5 of chain relay 106.

Relay 104 of connector CRU operates, and responsive to the noted operation of cut-through relay 107, connects the generator–3 lead through break contacts 2 of relay 105 and make contacts 1 of relay 104 to signal station S3 on line L1 as previously described.

*Station S4 selection*

Assuming the called party to have desired station S4 on line L1, the call designation 00 is dialed and recorded in connector unit CRU, which causes relay 141 to operate and extend the ground appearing on the units wire U0 to wire 00 of terminal board TB. This ground is thereafter extended over jumper 181 to the F4 wire extending to the battery-connected winding of both relays 104 and 105 through make contacts 3 and 4 of chain relay 106.

Both relays 104 and 105 operate, and the generator–4 wire is connected to the ring conductor of the called line through make contacts 2 of relay 105 and make contacts 1 of relay 104.

Station S4 is thereupon signalled responsive to the application of the generator–4 frequency to the called line.

It is to be understood the disclosed four-party terminal-per-station party-line signalling arrangement could be readily adapted to increase the number of stations on a line by increasing the number of frequency control relays in connector unit CRU and corresponding control wires. It will also be noted that the switch terminals allocated to any one party line are not necessarily adjacent terminals as the entire control of the ringing current is in the control apparatus CA and has no direct bearing on the location of the switch terminals.

While this invention has been shown and described embodying certain features merely for the purpose of illustration, it is to be clearly understood that this description is made only by way of example and not as a limitation to the scope of my invention.

I claim:

1. In an automatic telephone system, telephone lines each having one or more stations thereon, with each station of a multi-station line occupying a separate station position thereon, a group of callable switchboard terminals corresponding respectively to stations on the said telephone lines and connected respectively to the lines serving such stations, a group of equivalent connector-stage trunks, switching means, means including switch-control means controllable over any calling trunk for directing the switching means to connect such calling trunk to any desired called one of the said callable terminals, each trunk including individual station-selecting means settable according to any one of the said station positions, means controlled by the station-selecting means for selectively signalling the called station on the connected called line, a station-controller common to all said trunks and means for temporarily associating it individually with any calling one of them, means for conditioning the station controller according to the callable terminal to which the temporarily associated trunk is connected by the switching apparatus, and means responsive to the said conditioning of the station controller for setting the station-selecting means of the temporarily associated trunk according to the station location occupied on the called line by the called station.

2. In an automatic telephone system according to claim 1, the said means for setting the station-selecting means including control wires in the said station controller corresponding respectively to the said switchboard terminals, the said conditioning of the station controller comprising energizing the one of control wires which corresponds to the called switchboard terminal, and adjustable means in the said station controller for selectively associating any one of the control wires with the said station-selecting means to effect a corresponding desired setting thereof.

3. In an automatic telephone system according to claim 2, the said means for setting the station-selecting means of a trunk including a group of alternative selecting conductors individual to the trunk and respectively corresponding selecting conductors in the station controller, the said means for temporarily associating the station controller individually with a trunk including means for joining the selecting conductors of the controller respectively with those of the trunk, the said adjustable means for selectively associating the said control wires of the controller with the station-selecting means comprising means for selectively associating the control wires with the said selecting conductors in the station controller.

4. In an automatic telephone system according to claim 3, the said selecting conductors of the said controller and of any said trunk correspond to respective ones of the said station locations on a line.

References Cited in the file of this patent

UNITED STATES PATENTS

| | | |
|---|---|---|
| 2,388,071 | Miller | Oct. 30, 1945 |
| 2,659,770 | Elliott | Nov. 17, 1953 |
| 2,702,831 | Elliott | Feb. 22, 1955 |